United States Patent [19]
Ryan et al.

[11] Patent Number: 5,792,308
[45] Date of Patent: Aug. 11, 1998

[54] APPARATUS FOR APPLYING AN ADHESIVE COATED TAPE ON A CORE MOUNTED ON A MANDREL

[75] Inventors: Ralph L. Ryan, East Hanover; Edward J. Caprario, Elizabeth, both of N.J.

[73] Assignee: Compensating Tension Controls, Inc., West Caldwell, N.J.

[21] Appl. No.: 595,364

[22] Filed: Feb. 1, 1996

[51] Int. Cl.$^6$ ..................................... B32B 35/00
[52] U.S. Cl. .................. 156/446; 156/510; 156/526; 156/538; 156/543
[58] Field of Search .................. 156/446, 447, 156/448, 449, 456, 457, 458, 443, 526, 510, 538, 543; 242/532, 532.3, 533

[56] References Cited

U.S. PATENT DOCUMENTS

| | | | |
|---|---|---|---|
| 3,532,573 | 10/1970 | Herman | 156/187 |
| 3,901,757 | 8/1975 | Eglinton | 156/446 |
| 3,988,193 | 10/1976 | Arens | 156/446 |
| 4,300,974 | 11/1981 | Bauer | 156/360 |
| 4,325,766 | 4/1982 | Michael | 156/171 |
| 4,369,082 | 1/1983 | Kerwin | 156/238 |
| 4,484,970 | 11/1984 | Burzlaff et al. | 156/233 |
| 4,636,276 | 1/1987 | Nozaka | 156/353 |
| 4,692,196 | 9/1987 | Ellegood et al. | 156/187 |
| 4,781,782 | 11/1988 | Luhman et al. | 156/361 |
| 4,869,774 | 9/1989 | Wisbey | 156/523 |
| 5,021,116 | 6/1991 | Milgram, Jr. et al. | 156/475 |
| 5,125,997 | 6/1992 | Smith, Jr. | 156/230 |
| 5,196,082 | 3/1993 | Randolph | 156/353 |
| 5,312,501 | 5/1994 | Gruber et al. | 156/238 |
| 5,573,616 | 11/1996 | De Roeck | 156/185 |

Primary Examiner—Curtis Mayes
Attorney, Agent, or Firm—Richard M. Goldberg

[57] ABSTRACT

An apparatus for applying an adhesive coated tape on a core mounted on a mandrel, includes a mounting frame having mounted thereon an adhesive tape supply roller, a rewind roller, an idler roller mounted between the supply and rewind rollers such that the adhesive tape on the idler roller can be sandwiched between the idler roller and mandrel and transferred to the mandrel with the carrier layer being wound on the rewind roller, a motor for rotating the rewind roller, and a knife assembly pivotally mounted thereon adjacent the idler roller for cutting the adhesive layer extending between the supply roller and mandrel after the adhesive layer has been transferred to the mandrel; two link arms pivotally connecting the mounting frame about a pivot shaft secured to a main frame; a piston-cylinder assembly for pivotally moving the mounting frame about the link arms and relative to the mandrel such that the adhesive tape around the idler roller can be transferred to the mandrel; and a cam plate for pivotally moving the knife assembly to cause the adhesive layer which sticks to the knife to disengage from the knife assembly and fall onto the carrier layer.

22 Claims, 7 Drawing Sheets

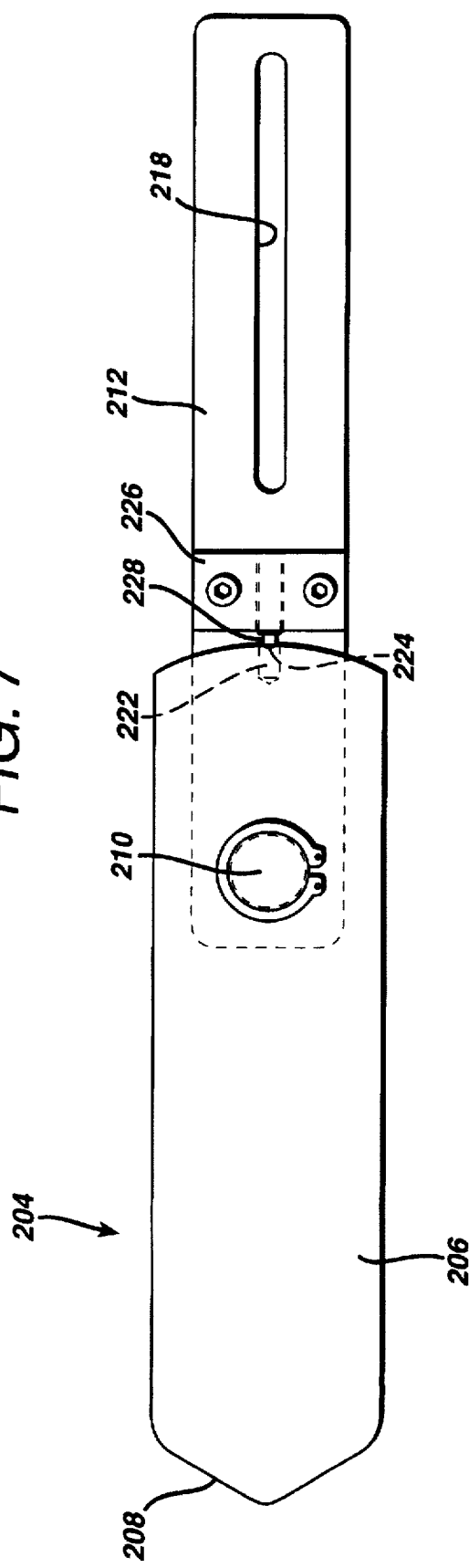
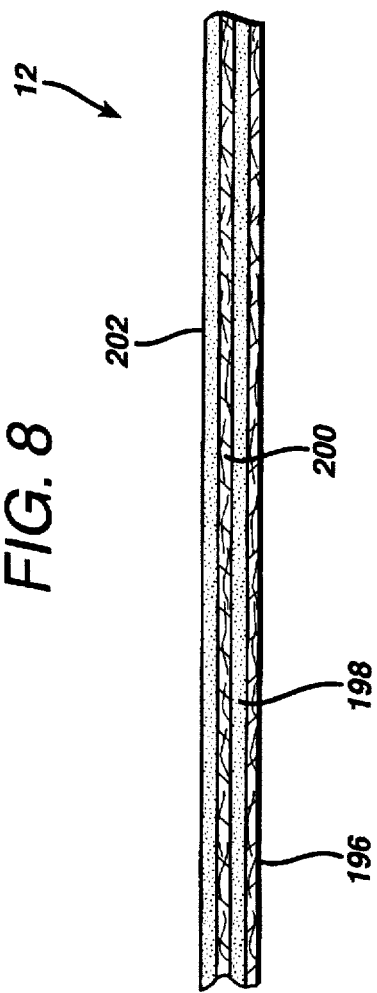
FIG. 7
FIG. 8

APPARATUS FOR APPLYING AN ADHESIVE COATED TAPE ON A CORE MOUNTED ON A MANDREL

BACKGROUND OF THE INVENTION

The present invention relates generally to an apparatus for applying an adhesive coated tape on a core mounted on a mandrel, and more particularly, is directed to such an apparatus incorporated directly into a web winding machine.

U.S. Pat. No. 5,125,997 to Smith, Jr. discloses an adhesive applicator. In this device, an adhesive tape which is formed by a paper carrier layer and a single strong adhesive layer thereon, is moved from a first capstan to a second capstan, with an idler roller therebetween over which the tape moves. Further, a manually activated pivoting arm carries a mandrel over which a core is removably carried and on which the adhesive layer is to be transferred.

In operation, the arm is pivoted down until the mandrel comes into contact with the adhesive tape against the idler roller. Then, the second capstan is rotated. As a result, movement of the tape thereon causes rotation of the idler roller and rotation of the mandrel. During rotation of the mandrel, the leading edge of the adhesive layer on the tape is adhered to the core and rotated therearound. However, the paper carrier layer continues on to the second capstan. When the adhesive layer completely covers the core, that is, during one revolution of the mandrel, the arm is manually pivoted up. Because the adhesive layer is very thin, it easily breaks, with the new leading end falling back onto the paper carrier layer.

The adhesive coated core on the mandrel is then removed and applied to a separate web winding machine on which a web containing labels is wound. Because the layer is entirely adhesive with no carrier layer, there is an outer exposed layer of adhesive on the core, to which the beginning end of a web can be secured.

At this time, the second capstan has stopped rotating, and is ready to provide adhesive to the next core mounted on the mandrel.

However, there are various problems with this arrangement.

First, the apparatus of this patent requires a device separate and apart from the web winding machine. This requires the extra steps of removing the adhesive loaded core from the machine and then mounting the adhesive loaded core on a mandrel of a separate web winding machine. This becomes cumbersome in practice and also may require down time of the web winding machine.

Second, the adhesive layer that is used must be a relatively strong adhesive, which is required to hold the tape on the core. However, this means that it will be difficult to release the last label of the web that is secured thereto when the labels are subsequently unwound from the web and applied to containers or the like.

OBJECTS AND SUMMARY OF THE INVENTION

Accordingly, it is an object of the present invention to provide an apparatus for applying an adhesive coated tape on a core mounted on a mandrel that overcomes the problems with the aforementioned prior art.

It is another object of the present invention to provide an apparatus for applying an adhesive coated tape on a core mounted on a mandrel in which the tape applicator is incorporated directly into the web winding machine, and in particular, adjacent the turret thereof.

It is still another object of the present invention to provide an apparatus for applying an adhesive coated tape on a core mounted on a mandrel in which there is no need for a device separate and apart from the web winding machine, thereby eliminating the extra steps of removing the adhesive loaded core from an adhesive applying machine and then applying it to a separate web winding machine.

It is yet another object of the present invention to provide an apparatus for applying an adhesive coated tape on a core mounted on a mandrel in which an adhesive layer can be used which includes a strong adhesive attached to the core on the mandrel, but a weak outer exposed adhesive that is secured to the last label on the web, so that the last label on the web can be used without destroying the same, that is, when the labels are finally unwound from the web, the last label will easily disengage from the weak adhesive.

In accordance with an aspect of the present invention, for use with a web winding machine including at least one mandrel, an apparatus for applying an adhesive coated tape on a core mounted on each mandrel, includes a mounting frame; a supply roller mounted on the mounting frame for holding a supply of adhesive tape wound thereon, the adhesive tape including a carrier layer and an adhesive layer; a rewind roller rotatably mounted on the mounting frame for taking up the carrier layer of the adhesive tape; means, mounted on the mounting frame, for rotating the rewind roller; and means for moving the mounting frame relative to the mandrel such that the adhesive tape extending between the supply roller and the rewind roller can be transferred to the mandrel, with the carrier layer being wound on the rewind roller.

Further, an idler roller is mounted on the mounting frame between the supply roller and the rewind roller and over which the adhesive tape travels, such that the adhesive tape on the idler roller can be sandwiched between the idler roller and the mandrel and then transferred to the mandrel, with the carrier layer being wound on the rewind roller.

The means for moving includes pivot means for pivotally moving the mounting frame relative to the mandrel. Specifically, the pivot means includes a pivot shaft secured to a main frame member, and at least one link arm, each link arm pivotally connected at one end to the pivot shaft and fixedly connected at an opposite end thereof to the mounting frame, such that the mounting frame is effectively pivotally mounted about the pivot shaft.

The pivot means includes means for controlling pivoting movement of the mounting frame about the pivot shaft, and specifically, piston-cylinder means having a cylinder pivotally connected to the main frame member, and a piston with a free end pivotally connected to the mounting frame and an opposite end slidably connected within the cylinder.

In accordance with another aspect of the present invention, for use with a web winding machine including at least one mandrel, an apparatus for applying an adhesive coated tape on a core mounted on one mandrel, includes a mounting frame; a supply roller mounted on the mounting frame for holding a supply of adhesive tape wound thereon, the adhesive tape including a carrier layer and an adhesive layer; a rewind roller rotatably mounted on the mounting frame for taking up the carrier layer of the adhesive tape; means, mounted on the mounting frame, for rotating the rewind roller; means for moving the mounting frame relative to the mandrel such that the adhesive tape extending between the supply roller and the rewind roller can be transferred to the mandrel, with the carrier layer being wound on the rewind roller; and a knife assembly mounted on the mounting frame for cutting the adhesive layer extending between the supply roller and the mandrel after the adhesive layer has been transferred to the mandrel.

The knife assembly is positioned on the mounting frame adjacent the idler roller. The knife assembly includes a knife, and a knife holder which holds the knife such that a cutting edge of the knife is positioned adjacent and spaced from the idler roller.

The knife assembly is positioned on the mounting frame such that the knife assembly automatically cuts the adhesive layer extending between the supply roller and the mandrel, upon continued pivoting movement of the mounting frame after the adhesive layer has been transferred to the mandrel.

In accordance with still another aspect of the present invention, for use with a web winding machine including at least one mandrel, an apparatus for applying an adhesive coated tape on a core mounted on one mandrel, includes a mounting frame; a supply roller mounted on the mounting frame for holding a supply of adhesive tape wound thereon, the adhesive tape including a carrier layer and an adhesive layer; a rewind roller rotatably mounted on the mounting frame for taking up the carrier layer of the adhesive tape; means, mounted on the mounting frame, for rotating the rewind roller; means for moving the mounting frame relative to the mandrel such that the adhesive tape extending between the supply roller and the rewind roller can be transferred to the mandrel, with the carrier layer being wound on the rewind roller; a knife assembly pivotally mounted on the mounting frame for cutting the adhesive layer extending between the supply roller and the mandrel after the adhesive layer has been transferred to the mandrel; and flicking means for quickly pivoting the knife assembly after the knife assembly cuts the adhesive layer such that the adhesive layer detaches from the knife assembly and falls back onto the carrier layer.

The knife assembly includes a knife, a knife holder which holds the knife such that a cutting edge of the knife is positioned adjacent and spaced from the idler roller, pivoting means for pivotally supporting the knife holder on the mounting frame, and biasing means for pivotally biasing the knife holder in a first direction to a first limit position; and the flicking means includes cam means for pivotally moving the knife holder in a second direction opposite to the first direction and against a force of the biasing means to cause the adhesive layer which sticks to the knife to disengage from the knife and fall onto the carrier layer.

In this regard, the knife holder includes an extension and the cam means includes a cam plate against which the extension hits upon movement of the mounting frame relative to the mandrel after the adhesive layer has been transferred to the mandrel.

The above and other objects, features and advantages of the invention will become readily apparent from the following detailed description thereof which is to be read in connection with the accompanying figures.

BRIEF DESCRIPTION OF THE DRAWINGS

FIG. 7 is a plan view of the cam member of the present invention; and

FIG. 8 is a cross-sectional view an adhesive coated tape used with the apparatus of FIG. 1.

DETAILED DESCRIPTION OF A PREFERRED EMBODIMENT

Figure 1:
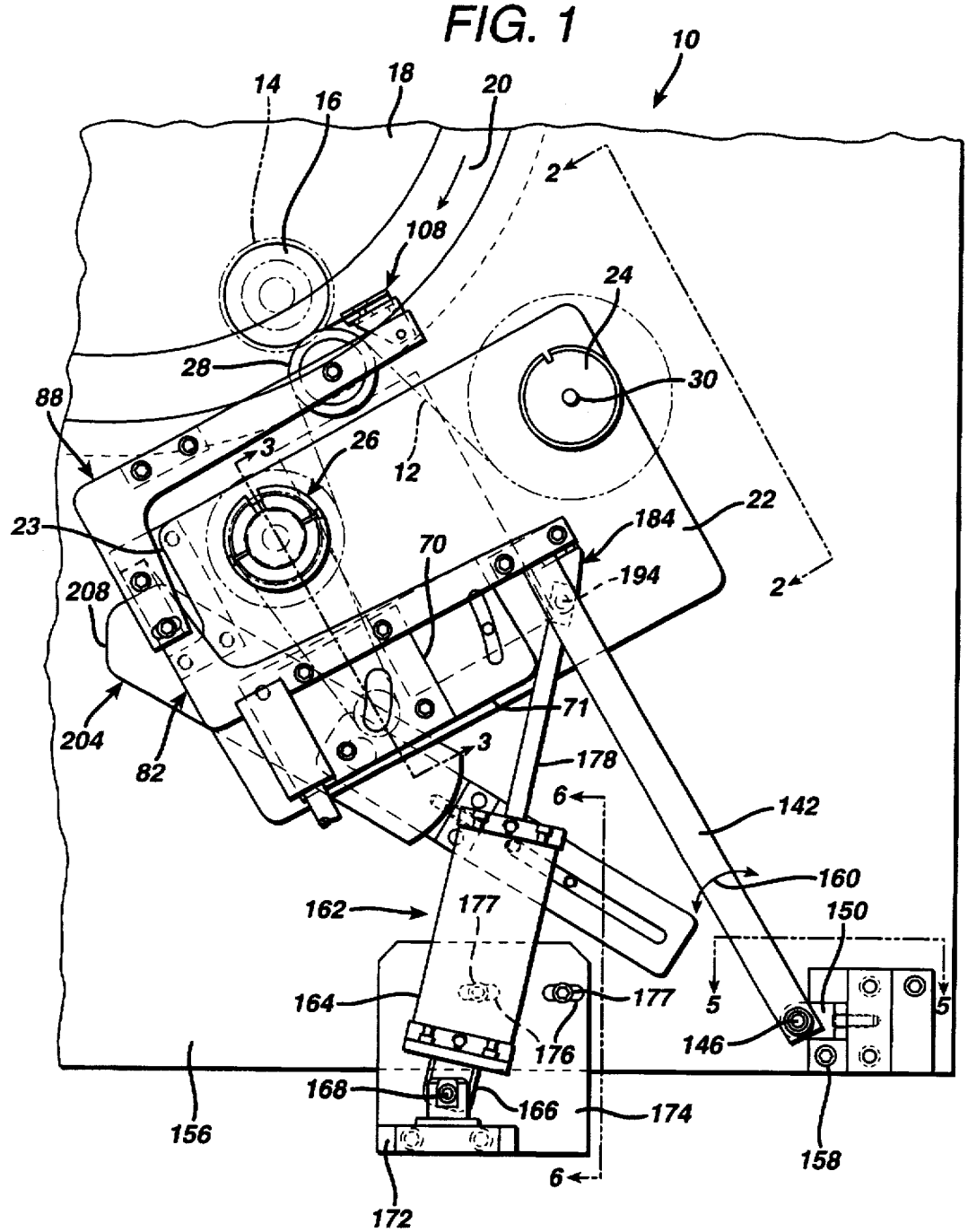
FIG. 1 is a side elevational view of an apparatus for applying an adhesive coated tape on a core mounted on a mandrel according to the present invention.

Referring to the drawings in detail, there is shown an apparatus 10 for applying an adhesive coated tape 12 on a core 14 removably slid over a mandrel 16 which is carried on a turret 18 of a web winding machine (not shown). Turret 18 includes a plurality of mandrels 16 (only one of which is shown) spaced along a common circle thereon, and turret 18 is rotatable in the direction of arrow 20 to rotate successive mandrels 16 to the position of apparatus 10.

Specifically, apparatus 10 includes a rectangular mounting plate 22 having a supply roller 24, a rewind roller 26 and an idler roller 28 mounted to the same side thereof, along respective parallel axes. As shown best in FIGS. 1 and 4, mounting plate 22 has a cut-away 23 portion at the upper corner thereof which is adjacent to rewind roller 26.

Figure 2:
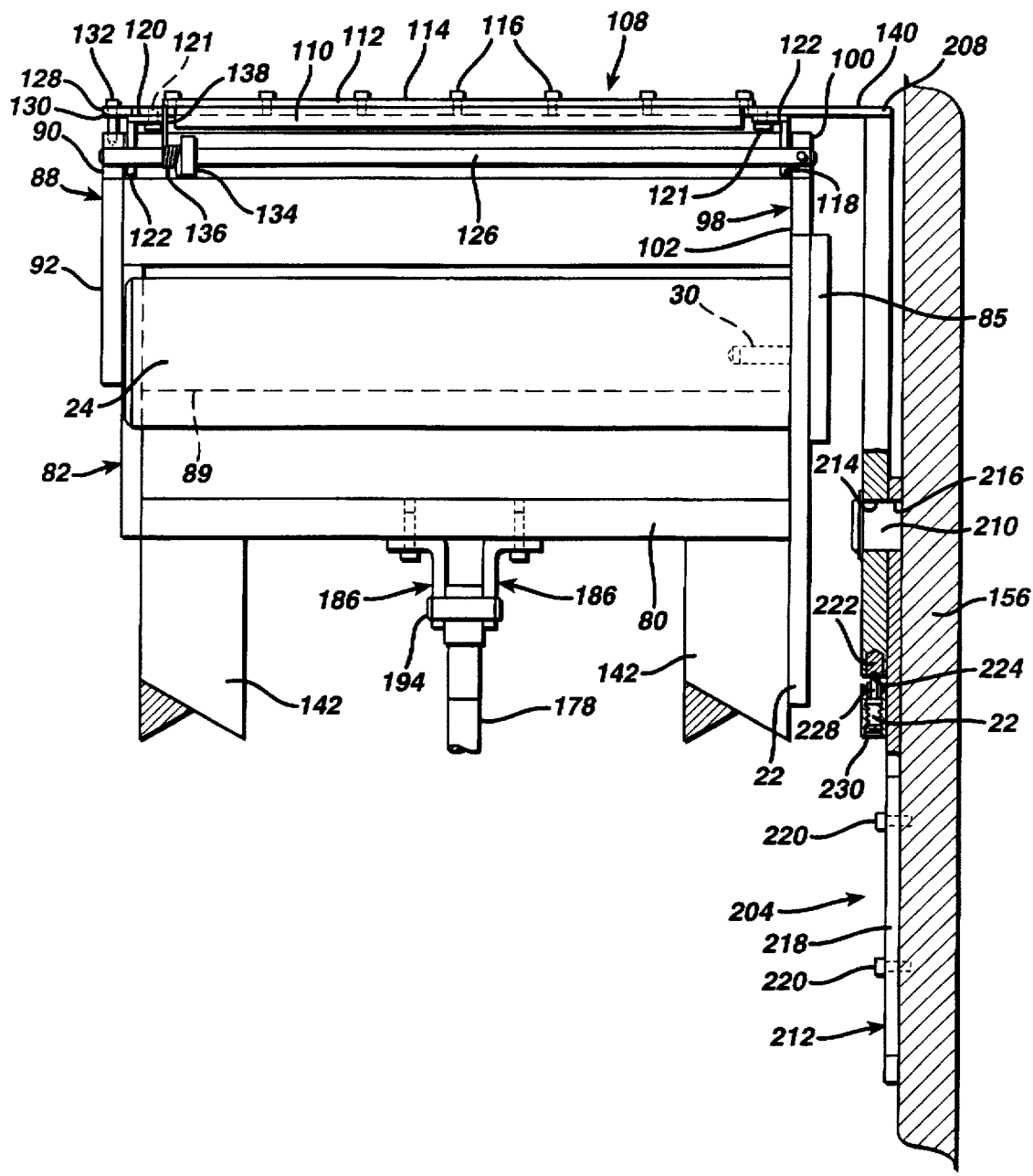
FIG. 2 is a cross-sectional view of the apparatus of FIG. 1, taken along line 2—2 thereof, after the knife has cut the adhesive tape.

As shown in FIGS. 1 and 2, supply roller 24 is fixed to one upper corner of mounting plate 22 by means of a central bolt 30.

Figure 3:
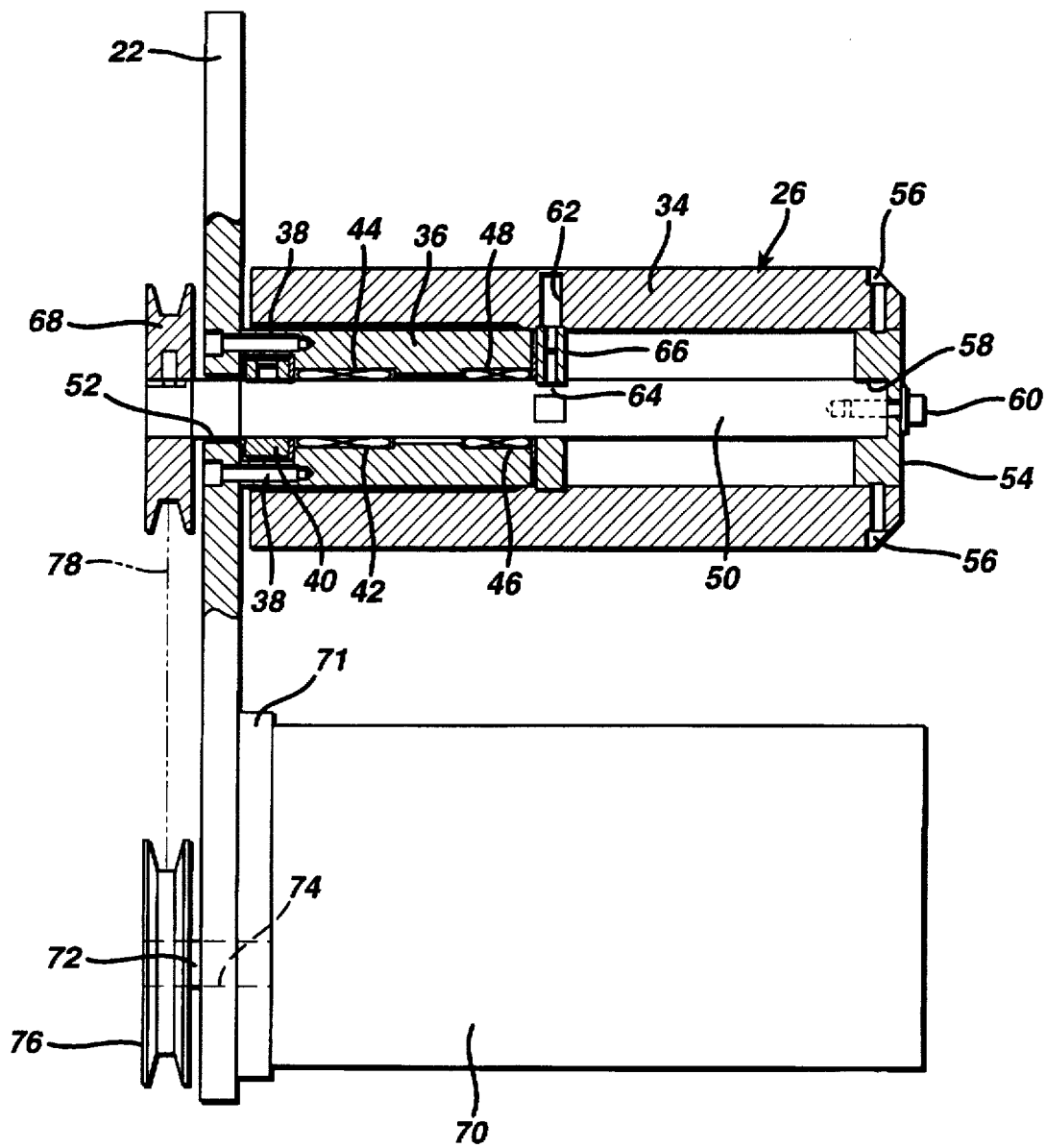
FIG. 3 is a partial cross-sectional view of the apparatus of FIG. 1, taken along line 3—3 thereof.

Referring to FIGS. 1 and 3, rewind roller 26 includes an annular roller sleeve 34 rotatably mounted on an annular boss bearing 36, which in turn, is fixed to mounting plate 22 by means of bolts 38. The end of boss bearing 36 closest to mounting plate 22 is positioned against a thrust washer 40. The inner annular surface of boss bearing 36 includes a clutch bearing 42 in a recess 44 adjacent to thrust washer 40, and another bearing 46 in a recess 48 at the opposite end of boss bearing 36.

A shaft 50 extends through bearings 36, 42 and 46 and through thrust washer 40, with a first end of shaft 50 extending to the outer end of sleeve 34 and the opposite second end of shaft 50 extending through an opening 52 in mounting plate 22 so as to extend to the opposite side of mounting plate 22. A circular end closure plate 54 is secured within the outer end of sleeve 34 by means of bolts 56, and includes a central recess 58 that receives the first end of shaft 50 therein. A bolt 60 secures the first end of shaft 50 in central recess 58. With this arrangement, when shaft 50 rotates, sleeve 34 rotates therewith, supported by boss bearing 36.

Sleeve 34 further includes an opening 62 therethrough and shaft 50 includes at least one flat 64 thereon, with a radially oriented tube 66 secured between sleeve 34 and shaft 50 so as to connect opening 62 with flat 64. With this arrangement, a screw (not shown) can be screwed onto flat 64 to further secure sleeve 34 to shaft 50. Grippers (not shown) can be inserted in a recess 51 (FIG. 4) in sleeve 34 for holding a roll thereon.

Figure 4:
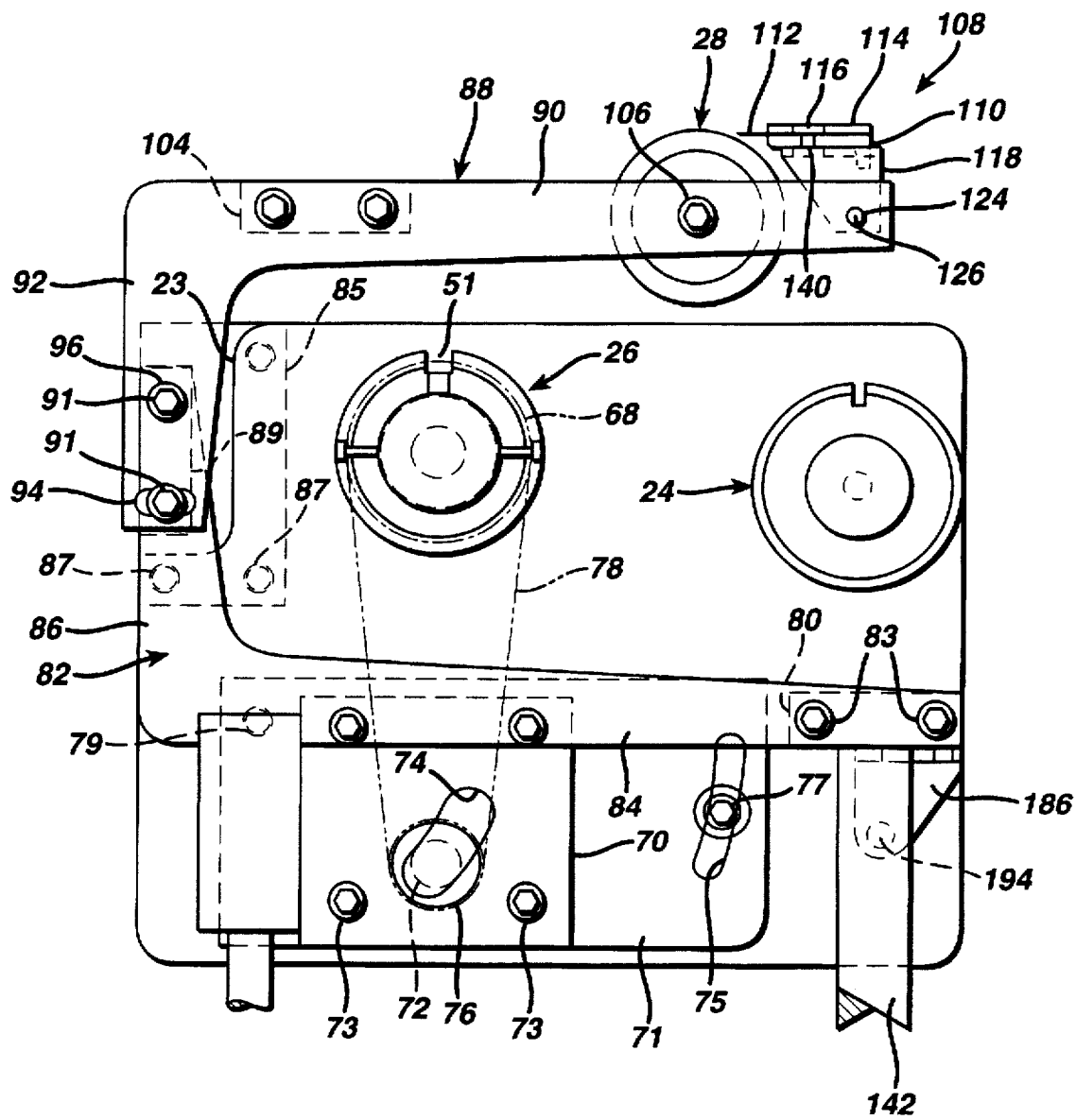
FIG. 4 is an enlarged elevational view of the mounting plate, supply roller, rewind roller, idler roller and knife of FIG. 1.
Figure 5:
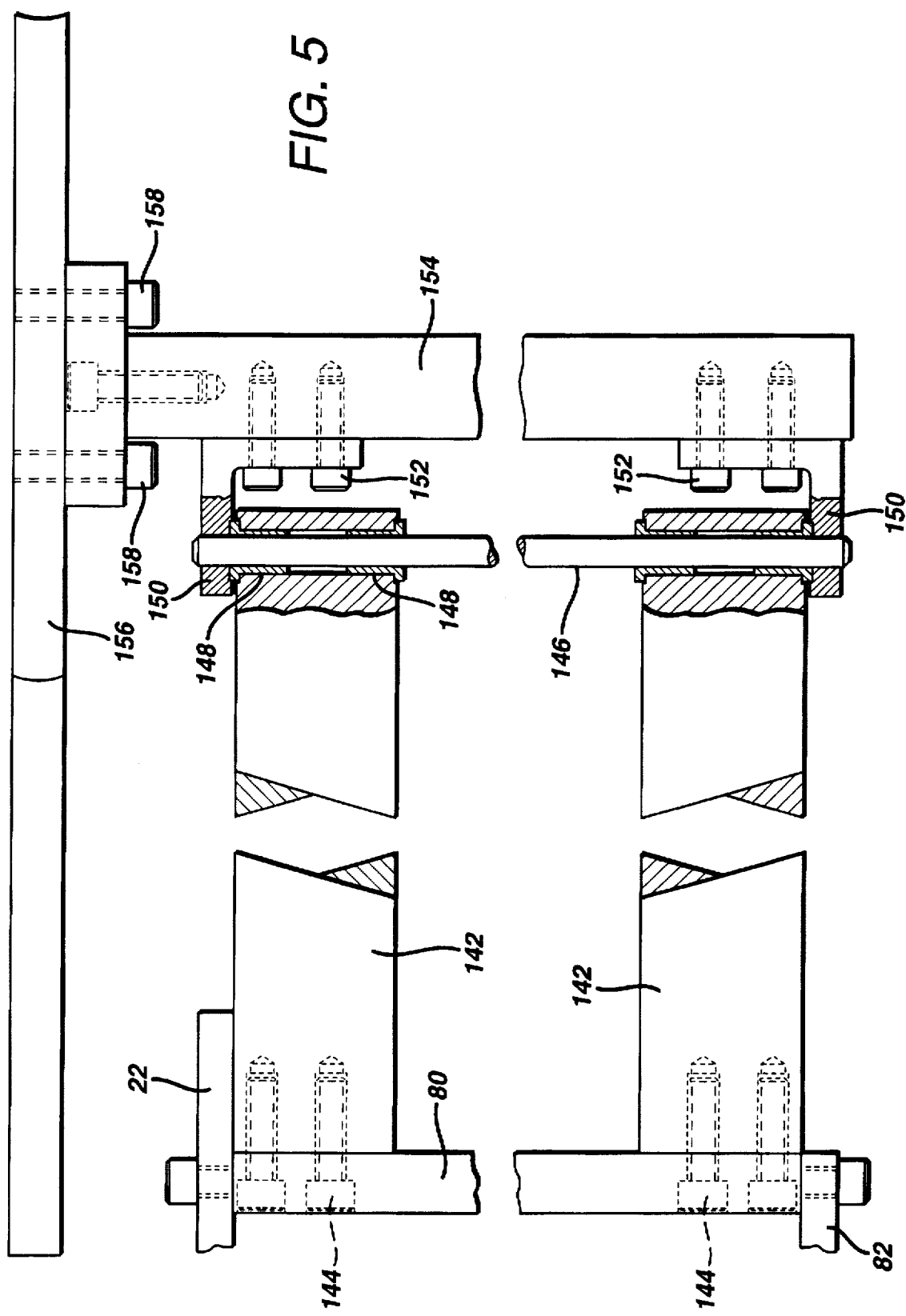
FIG. 5 is a partial cross-sectional view of the apparatus of FIG. 1, taken along line 5—5 thereof.

The end of shaft 50 that extends to the other side of mounting plate 22 is centrally secured to a pulley 68. A drive motor 70 is mounted to the same side of mounting plate 22 as rewind roller 26. Specifically, drive motor 70 is mounted to a motor mounting plate 71 by bolts 73, as best shown in FIGS. 3 and 4. Motor mounting plate 71 includes an arcuate slot 75, and one bolt 77 extends within arcuate slot 75 into threaded engagement with mounting plate 22, and another bolt 79 at the opposite side of motor mounting plate 71 extends through a hole therein and is threadedly engaged with mounting plate 22 and functions as a pivot for motor mounting plate 71. Thus, motor mounting plate 71 can be pivoted about bolt 79 to a desired position, whereby bolt 77 rides within arcuate slot 75, and then bolts 77 and 79 are tightened to secure motor mounting plate 71 to mounting plate 22 at a desired position.

Drive motor 70 includes an output shaft 72 that extends through an arcuate opening 74 in mounting plate 22 to the opposite side of mounting plate 22. A second pulley 76 is fixed to the free end of output shaft 72, and a belt 78 extends around pulleys 68 and 76. Thus, motor 70 causes rewind roller 26 to rotate by means of output shaft 72, pulleys 68 and 76, shaft 50 and sleeve 34. By adjusting motor mounting plate 71 with respect to arcuate slot 75, belt 78 can be adjusted to a desired tension about pulleys 68 and 76.

Referring now to FIGS. 2 and 4, a cantilevered beam 80 is connected at one end to, and extends transversely out from, mounting plate 22, at a position below supply roller 24. Beam 80 is positioned approximately one-third up from the lower edge of rectangular mounting plate 22.

An L-shaped brace 82 is connected to cantilevered beam 80, and includes a first leg 84 extending rearwardly from cantilevered beam 80 and substantially parallel to the lower edge of rectangular mounting plate 22, and a second leg 86 extending substantially perpendicular to the lower edge of rectangular mounting plate 22 and integrally connected with the rear end of first leg 84. Specifically, the free end of first leg 84 is connected to the free end of cantilevered beam 80 by bolts 83, and the upper edge of second leg 86 extends almost to the upper edge of rectangular mounting plate 22.

In addition, a doubler plate 85 is secured to the opposite side of mounting plate 22 in covering relation to cut-away portion 23 thereof, by means of bolts 87. An upper cross beam 89 is connected between the upper free end of second leg 86 and doubler plate 85 by means of upper and lower bolts 91, with cross beam 89 being separated slightly from doubler plate 85, the purpose for which will be made apparent hereinafter.

An inverted L-shaped upper brace 88 is connected to the upper portion of second leg 86 of L-shaped brace 82. Specifically, upper brace 88 includes a first leg 90 extending substantially parallel to the upper edge of rectangular mounting plate 22 and spaced thereabove, and a second leg 92 extending perpendicular to the upper edge of rectangular mounting plate 22 and integrally connected with one end of first leg 90. The lower end of second leg 92 includes a lower elongated slot 94 that receives the lowermost bolt 91 and an upper opening 96 that receives the uppermost bolt 91. With this arrangement, the lower end of second leg 92 is secured by bolts 91 to the upper portion of second leg 86 of brace 88, and the relative inclination thereof can be adjusted by means of elongated slot 94.

A similar inverted L-shaped upper brace 98 is pivotally connected to doubler plate 85 within cut-away portion 23 of mounting plate 22, in parallel, spaced relation to upper brace 88, as shown in FIG. 2. Thus, upper brace 98 includes a first leg 100 in parallel, spaced relation to first leg 90, and a second leg 102 in parallel, spaced relation to second leg 92. The lower end of second leg 102 extends between the respective end of upper cross beam 89 and doubler plate 85, and is pivotally secured to bolts 91 (not shown) which extend between upper cross beam 89 and doubler plate 85, in the same manner that second leg 92 is pivotally secured to second leg 86. Further, an upper stress bar 104 is connected between first legs 90 and 100, as shown in FIG. 4, to provide structural connection thereof.

A shaft 106 is connected between the free ends of first legs 90 and 100 of upper braces 88 and 98, and idler roller 28 is mounted thereon. In this manner, an adhesive coated tape 12 is supplied from supply roller 24, around idler roller 28 and is rewound onto rewind roller 26, as shown in FIG. 1.

In addition, as shown best in FIGS. 2 and 4, a knife assembly 108 is mounted to the free ends of first legs 90 and 100 for automatically cutting the adhesive coated tape 12 after application thereof to a core 14. Knife assembly 108 includes an elongated knife support 110 that extends substantially the entire distance between first legs 90 and 100 and on which a knife 112 is seated, such that knife 112 extends outwardly therefrom toward idler roller 28. A clamping plate 114 is secured on knife support 110 by bolts 116 so as to sandwich knife 112 therebetween.

Knife support 110 is held by L-shaped outer knife brackets 118, each having an upper leg 120 thereof secured to the underside of knife support 112 at a respective end thereof by a bolt 121. The lower end of the lower leg 122 of each bracket 118 has an opening 124 which receives a shaft 126 that extends between first legs 90 and 100. Knife support 110 is thereby rotatably or pivotally held about shaft 126.

A first lateral extension 128 is provided to the outer side of knife support 110 and includes an oval or elongated slot 130. A bolt 132 extends through slot 130 and is threadedly engaged with the upper end of first leg 90, as shown best in FIG. 2. In this manner, the pivotal movement of knife support 110 is limited by the extent that bolt 132 hits against the ends of slot 130.

A collar 134 is secured on shaft 126 at the outer end thereof, and a spring 136 is wrapped about shaft 126 adjacent to collar 134, such that one end of spring 136 is secured to collar 134 and the opposite end of spring 136 forms an extension finger 138 that abuts against first lateral extension 128, so that spring 136 biases knife support 110 in the counter-clockwise direction of FIG. 4, to one end limit of slot 130. In this position, however, the free end of knife 112 is spaced apart from idler roller 28 so as not to interfere with travel of adhesive coated tape 12 thereon.

A second lateral extension 140 extends from the opposite inner side of knife support 110. As will be described hereinafter, second lateral extension 140 is biased upwardly in a quick flicking action so that the adhesive coated tape 12 that sticks to knife 112 after cutting of the same is removed therefrom.

Referring now to FIGS. 1, 2, 4 and 5, it is seen that two pivot link arms 142 are arranged in parallel, spaced relation, with an upper end of each link arm 142 fixed to the underside of cantilevered beam 80 at opposite ends thereof, by bolts 144. The opposite lower ends of link arms 142 are pivotally mounted on a common shaft 146 by means of flanged bushings 148. The opposite ends of shaft 146 are secured to one leg of respective L-shaped brackets 150. The other legs of brackets 150 are secured by bolts 152 to a transverse frame member 154, which in turn, is secured to a main frame member 156 by bolts 158.

With this arrangement, mounting plate 22 is movable in a circular path in the direction of arrow 160 (FIG. 1) about a center defined by the axis of shaft 146. Thus, idler roller 28 can be moved to a position adjacent mandrel 16 to apply adhesive coated tape 12 to core 14 thereon.

Figure 6:
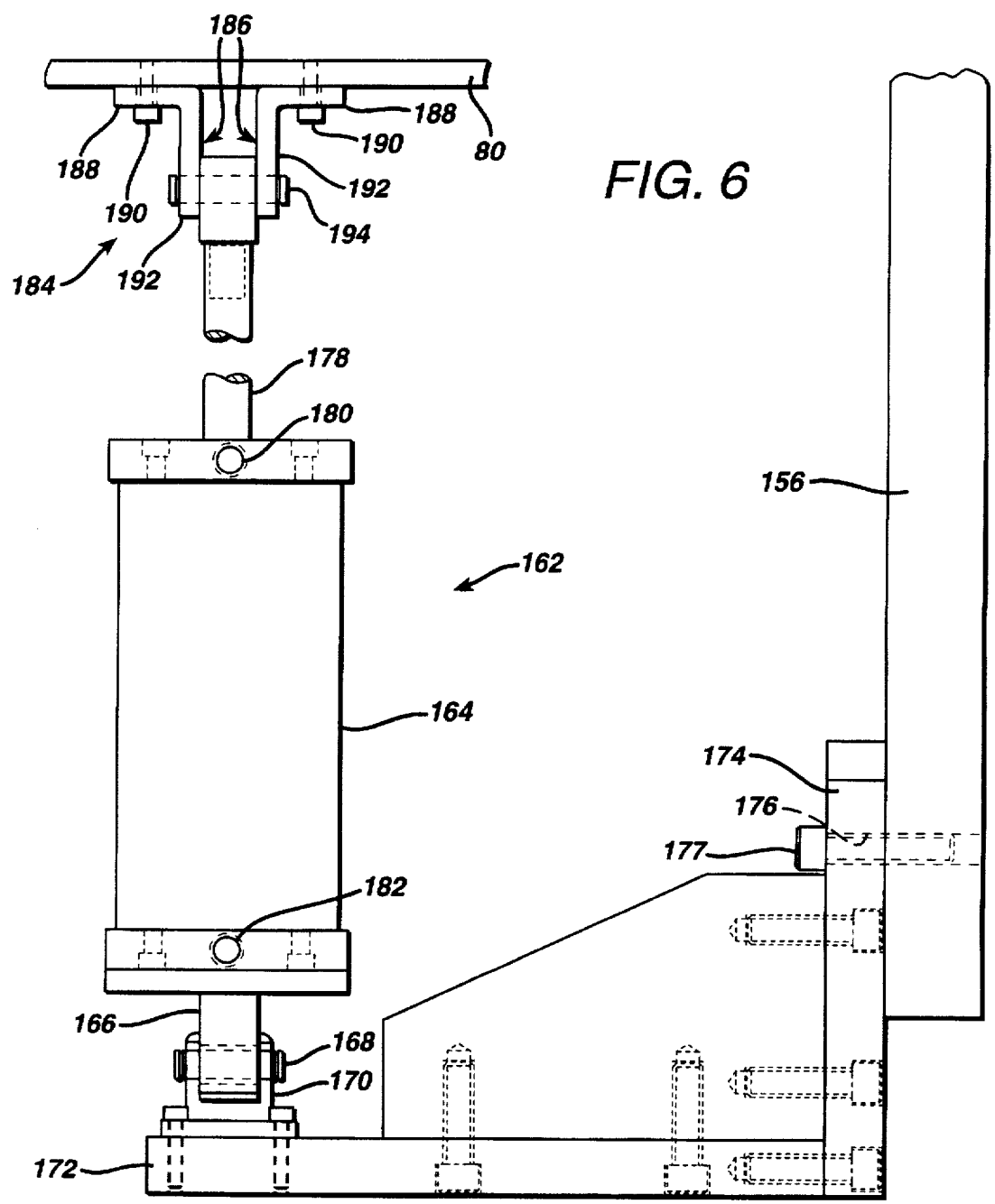
FIG. 6 is an elevational view of the apparatus of FIG. 1, viewed along line 6—6 thereof.

In order to control movement of mounting plate 22 about shaft 146, a piston-cylinder assembly 162 is connected between main frame member 156 and cantilevered beam 80, as shown best in FIGS. 1, 2 and 6. Piston-cylinder assembly 162 includes a cylinder 164 having a lower extension 166 secured thereto. Lower extension 166 is pivotally mounted to a shaft 168 that is mounted to a bracket 170 secured to a base plate 172. Base plate 172, in turn, is fixed to a cylinder mounting plate 174, which in turn, is adjustably mounted on main frame member 156. Specifically, as shown in FIG. 1, cylinder mounting plate 174 includes two horizontally oriented elongated slots 176, and bolts 177 extend through elongated slots 176 into threaded engagement with main frame member 156. Thus, cylinder mounting plate 174 can adjustably be mounted on main frame member 156.

A piston rod 178 extends through cylinder 164 in a conventional manner, for retraction and extension. In this regard, cylinder 164 is a double acting cylinder and includes an upper port 180 and a lower port 182 for introduction of oil or air thereinto, in order to control the retraction and extension, respectively, of piston rod 178. The free upper end of piston rod 178 is pivotally secured to the underside of cantilevered beam 80 at a position substantially midway between link arms 142. In this regard, a pivot bracket 184 is fixed to the underside of cantilevered beam 80, and is comprised of two inverted L-shaped bracket members 186, having first legs 188 fixed by bolts 190 to the underside of cantilevered beam 80 and second legs 192 arranged in parallel, spaced relation with a pivot pin 194 extending between the free ends of second legs 192. Pivot pin 194 extends through the upper, free end of piston rod 178 to pivotally secure piston rod 178 to cantilevered beam 80.

With this arrangement, when piston rod 178 is retracted by means of pressurized oil or air supplied through upper port 180, mounting plate 22 is caused to pivot about shaft 146 in a counter-clockwise direction. On the other hand, when piston rod 178 is extended by pressurized oil or air supplied through lower port 182, mounting plate 22 is caused to pivot about shaft 146 in a clockwise direction.

Mounting plate 22 is initially in the position shown in FIG. 1. When a mandrel 16 is rotated by turret 18 into the position shown in FIG. 1, rewind roller 26 is rotated by activation of motor 70. This causes adhesive coated tape 12 to be applied to core 14 on mandrel 16.

As shown in FIG. 8, adhesive coated tape 12 used with the present invention is different from that of the '997 patent. Specifically, tape 12 includes a paper carrier layer 196, a weak adhesive layer 198 of a release adhesive thereon, a separation layer 200 thereon and a strong adhesive layer 202 thereon. It is noted that layers 198, 200 and 202 form a composite layered construction that is separated from carrier layer 196. Thus, during the operation, strong adhesive layer 202 strongly adheres to core 14, leaving weak adhesive layer 198 exposed to the outside for securement of the web of paper thereto. Weak adhesive layer 198 is secured to a web containing labels, so that the last label on the web can be used without destroying the same. In other words, when the labels are finally unwound from the web, the last label will easily disengage with weak adhesive layer 198, contrary to the '997 patent which requires the use of a single strong adhesive layer.

During this time, carrier layer 196 is rewound onto rewind roller 26. However, a portion of layers 198, 200 and 202 is still held on carrier layer 196. It will be appreciated that, because of the number of layers 198, 200 and 202, it would be practically impossible to use this tape in the '997 patent, since it would not break upon upward movement of the pivoting arm thereof.

Accordingly, it is necessary to cut the same after application to core 14. In this regard, knife assembly 108 is provided, as aforementioned, with the free end of knife 112 extending toward the nip between mandrel 16 and idler roller 28. As previously discussed, knife support 110 is normally biased in the counter-clockwise direction of FIG. 4 by spring 136 (FIG. 2) to the limit position shown in FIG. 4.

At the end of the adhering operation, mandrel 16 and idler roller 28 stop rotating, as a result of cessation by motor 70. Then, piston rod 178 is retracted, causing mounting frame 22 to move counter-clockwise about shaft 146, thereby moving mounting frame 22 away from mandrel 16. However, composite layers 198, 200 and 202 still extend from carrier layer 196 to mandrel 16. During continued movement, knife 112, which moves therewith, moves into the gap created between mandrel 16 and idler roller 28, and cuts layers 198, 200 and 202. Mandrel 16 is then rotated to the next position by turret 18 in order to position core 14 with adhesive thereon at the web winding position.

However, strong adhesive layer 202 of the new leading edge of composite layers 198, 200 and 202, which has been cut by knife 112, is now adhered to knife 112.

Therefore, a cam member 204 is fixed to main frame member 156 at a particular location to cause a quick "flick" of knife 112, that is, a quick rotation of knife 112 in the clockwise direction about shaft 126 and against the force of spring 136, which results in strong adhesive layer 202 disengaging from knife 112. As a result, the leading edges of layers 198, 200 and 202 fall back onto paper carrier layer 196, ready for the next operation.

Specifically, and referring to FIGS. 1, 2 and 7, cam member 204 includes an elongated cam plate 206 having a substantially V-shaped end 208. V-shaped end 208 is positioned so that, upon continued counter-clockwise movement of mounting plate 22, second lateral extension 140 quickly hits against V-shaped end 208. This causes second lateral extension 140 to be biased upwardly in a quick flicking action against the force of spring 136 so that composite layers 198, 200 and 202 of adhesive coated tape 12 that stick to knife 112 after cutting of the same, detach from knife 112 and fall back onto carrier layer 196.

In order to correctly position V-shaped end 208, cam plate 206 is secured by a pin 210 to an elongated cam support plate 212. In this regard, an opening 214 is provided about one-quarter of the way from the lower end of cam plate 206 and an opening 216 is provided near the upper end of cam support plate 212, with pin 210 being positioned within openings 214 and 216.

The lower end of cam support plate 212 is provided with a central, elongated slot 218 therein, and bolts 220 extend through slot 218 and are threadedly engaged in main frame member 156. By adjusting the positions of bolts 220 in slot 218, cam support plate 212, and thereby cam plate 206, can be adjusted along the lengthwise direction thereof.

In order to prevent damage to knife assembly 108 in the event of misadjustment of cam member 204, cam plate 206 is pivotally secured to cam support plate 212 by pin 210. The lower end of cam plate 206 includes an insert member 222 therein which includes a slight depression 224. A small housing 226 is provided on the outer surface of cam support plate 212, immediately below insert member 222. A plunger 228 is slidably positioned within housing 226 and is biased outwardly of housing 226 by means of a coil spring 230, such that the free end of plunger 228 fits within depression 224.

During normal operation, the force on cam plate 206 during the knife flicking operation is not sufficient to overcome the force of coil spring 230 so that cam plate 206 and cam support plate 212 are maintained in the colinear relation of FIG. 7. However, if the force on cam plate 206 becomes greater than a predetermined amount, cam plate 206 is caused to rotated about pin 210, such that plunger 228 is forced downwardly against the force of coil spring 230, thereby permitting rotation of cam plate 206 about pin 210.

Thus, with the present invention, the tape applicator is incorporated directly into the web winding machine, and in particular, adjacent turret 18 thereof. Further, there is no need for a device separate and apart from the web winding machine, thereby eliminating the extra steps of removing the adhesive loaded core from an adhesive applying machine and then applying it to a separate web winding machine, as with the '997 patent.

Further, an adhesive layer can be used which includes a strong adhesive layer 202 attached to core 14 on mandrel 16, but a weak adhesive layer 198 that is secured to the last label on the web, so that the last label on the web can be used without destroying the same. In other words, when the labels are finally unwound from the web, the last label will easily disengage with the weak adhesive.

It will be appreciated that various modifications can be made to the present invention within the scope of the claims herein. Thus, although mounting plate 22 is described as being pivoted by piston-cylinder assembly 162 and link arms 142, this arrangement could be replaced by other arrangements. For example, the lower ends of link arms 142 could be fixed to a motor shaft that rotates link arms 142. Alternatively, piston-cylinder assembly 162 could be secured to link arms 142, rather than mounting plate 22, to cause rotation of link arms 142.

It will also be appreciated that, in the event of a single adhesive layer being provided on carrier layer 196, knife assembly 108 can be dispensed with. In such case, the single adhesive layer will break merely by pivoting movement of mounting plate 22.

Of course, while the present invention has been described in relation to a turret 18 containing a plurality of mandrels 16, the present invention can be used with a web winding machine having only one mandrel.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. For use with a web winding machine including at least one mandrel, an apparatus for applying an adhesive coated tape on a core mounted on each said mandrel, comprising:
   a mounting frame;
   a supply roller mounted on said mounting frame for holding a supply of adhesive tape wound thereon, said adhesive tape including a carrier layer and an adhesive layer;
   a rewind roller rotatably mounted on said mounting frame for taking up the carrier layer of said adhesive tape;
   means, mounted on said mounting frame, for rotating said rewind roller; and
   means for moving said mounting frame relative to said mandrel such that said adhesive tape extending between said supply roller and said rewind roller can be transferred to said mandrel, with the carrier layer being wound on said rewind roller, said means for moving including pivot means for pivotally moving said mounting frame relative to said mandrel, and said pivot means includes:
   a pivot shaft secured to a main frame member, and
   at least one link arm, each link arm pivotally connected at one end to said pivot shaft and fixedly connected at an opposite end thereof to said mounting frame, such that said mounting frame is effectively pivotally mounted about said pivot shaft.

2. The apparatus of claim 1, further comprising an idler roller mounted on said mounting frame between said supply roller and said rewind roller and over which said adhesive tape travels, such that said adhesive tape on said idler roller can be sandwiched between said idler roller and the mandrel and then transferred to said mandrel, with the carrier layer being wound on said rewind roller.

3. The apparatus of claim 1, wherein said pivot means includes means for controlling pivoting movement of said mounting frame about said pivot shaft.

4. The apparatus of claim 3, wherein said means for controlling includes piston-cylinder means having a cylinder pivotally connected to said main frame member, and a piston with a free end pivotally connected to said mounting frame and an opposite end slidably connected within said cylinder.

5. The apparatus of claim 1, wherein said adhesive layer includes:
   a layer of weak adhesive on said carrier layer,
   a separation layer on said layer of weak adhesive, and
   a layer of strong adhesive on said separation layer,
   such that said layer of strong adhesive, said separation layer and said layer of weak adhesive detach from said carrier layer and said layer of strong adhesive is secured to the core on the mandrel.

6. For use with a web winding machine including at least one mandrel, an apparatus for applying an adhesive coated tape on a core mounted on one said mandrel, comprising:
   a mounting frame;
   a supply roller mounted on said mounting frame for holding a supply of adhesive tape wound thereon, said adhesive tape including a carrier layer and an adhesive layer;
   a rewind roller rotatably mounted on said mounting frame for taking up the carrier layer of said adhesive tape;
   means, mounted on said mounting frame, for rotating said rewind roller;
   means for moving said mounting frame relative to said mandrel such that said adhesive tape extending between said supply roller and said rewind roller can be transferred to said mandrel, with the carrier layer being wound on said rewind roller, said means for moving including pivot means for pivotally moving said mounting frame relative to said mandrel, said pivot means including:
   a pivot shaft secured to a main frame member, and
   at least one link arm, each link arm pivotally connected at one end to said pivot shaft and fixedly connected at an opposite end thereof to said mounting frame, such that said mounting frame is effectively pivotally mounted about said pivot shaft; and
   a knife assembly mounted on said mounting frame for cutting the adhesive layer extending between said supply roller and the mandrel after said adhesive layer has been transferred to said mandrel.

7. The apparatus of claim 6, wherein said pivot means includes means for controlling pivoting movement of said mounting frame about said pivot shaft.

8. The apparatus of claim 7, wherein said means for controlling includes piston-cylinder means having a cylinder pivotally connected to said main frame member, and a piston with a free end pivotally connected to said mounting frame and an opposite end slidably connected within said cylinder.

9. For use with a web winding machine including at least one mandrel, an apparatus for applying an adhesive coated tape on a core mounted on one said mandrel, comprising:

a mounting frame;

a supply roller mounted on said mounting frame for holding a supply of adhesive tape wound thereon, said adhesive tape including a carrier layer and an adhesive layer;

a rewind roller rotatable mounted on said mounting frame for taking up the carrier layer of said adhesive tape;

means, mounted on said mounting frame, for rotating said rewind roller;

means for moving said mounting frame relative to said mandrel such that said adhesive tape extending between said supply roller and said rewind roller can be transferred to said mandrel, with the carrier layer being wound on said rewind roller, said means for moving including pivot means for pivotally moving said mounting frame relative to said mandrel; and a knife assembly mounted on said mounting frame for cutting the adhesive layer extending between said supply roller and the mandrel after said adhesive layer has been transferred to said mandrel, and said knife assembly is positioned on said mounting frame such that said knife assembly automatically cuts the adhesive layer extending between said supply roller and the mandrel, upon continued pivoting movement of said mounting frame after said adhesive layer has been transferred to said mandrel.

10. For use with a web winding machine including at least one mandrel, an apparatus for applying an adhesive coated tape on a core mounted on one said mandrel, comprising:

a mounting frame;

a supply roller mounted on said mounting frame for holding a supply of adhesive tape wound thereon, said adhesive tape including a carrier layer and an adhesive layer;

a rewind roller rotatably mounted on said mounting frame for taking up the carrier layer of said adhesive tape;

an idler roller mounted on said mounting frame between said supply roller and said rewind roller and over which said adhesive tape travels, such that said adhesive tape on said idler roller can be sandwiched between said idler roller and the mandrel and then transferred to said mandrel, with the carrier layer being wound on said rewind roller;

means, mounted on said mounting frame, for rotating said rewind roller;

means for moving said mounting frame relative to said mandrel such that said adhesive tape extending between said supply roller and said rewind roller can be transferred to said mandrel, with the carrier layer being wound on said rewind roller; and a knife assembly mounted on said mounting frame for cutting the adhesive layer extending between said supply roller and the mandrel after said adhesive layer has been transferred to said mandrel, said knife assembly being positioned on said mounting frame adjacent said idler roller, said knife assembly including:

a knife, and a knife holder which holds said knife such that a cutting edge of said knife is positioned adjacent and spaced from said idler roller.

11. The apparatus of claim 10, wherein said means for moving includes pivot means for pivotally moving said mounting frame relative to said mandrel.

12. The apparatus of claim 10, wherein said adhesive layer includes:

a layer of weak adhesive on said carrier layer, a separation layer on said layer of weak adhesive, and a layer of strong adhesive on said separation layer, such that said layer of strong adhesive, said separation layer and said layer of weak adhesive detach from said carrier layer and said layer of strong adhesive is secured to the core on the mandrel.

13. For use with a web winding machine including at least one mandrel, an apparatus for applying an adhesive coated tape on a core mounted on one said mandrel, comprising:

a mounting frame;

a supply roller mounted on said mounting frame for holding a supply of adhesive tape wound thereon, said adhesive tape including a carrier layer and an adhesive layer;

a rewind roller rotatably mounted on said mounting frame for taking up the carrier layer of said adhesive tape;

means, mounted on said mounting frame, for rotating said rewind roller;

means for moving said mounting frame relative to said mandrel such that said adhesive tape extending between said supply roller and said rewind roller can be transferred to said mandrel, with the carrier layer being wound on said rewind roller;

a knife assembly pivotally mounted on said mounting frame for cutting the adhesive layer extending between said supply roller and the mandrel after said adhesive layer has been transferred to said mandrel; and flicking means for quickly pivoting said knife assembly after said knife assembly cuts the adhesive layer such that said adhesive layer detaches from said knife assembly and falls back onto the carrier layer.

14. The apparatus of claim 13, wherein:

said knife assembly includes:

a knife, a knife holder which holds said knife such that a cutting edge of said knife is positioned adjacent and spaced from said idler roller, pivoting means for pivotally supporting said knife holder on said mounting frame, and biasing means for pivotally biasing said knife holder in a first direction to a first limit position; and said flicking means includes cam means for pivotally moving said knife holder in a second direction opposite to said first direction and against a force of said biasing means to cause said adhesive layer which sticks to said knife to disengage from said knife and fall onto said carrier layer.

15. The apparatus of claim 14, wherein said knife holder includes an extension and said cam means includes a cam plate against which said extension hits upon movement of said mounting frame relative to said mandrel after said adhesive layer has been transferred to said mandrel.

16. The apparatus of claim 13, further comprising an idler roller mounted on said mounting frame between said supply roller and said rewind roller and over which said adhesive tape travels, such that said adhesive tape on said idler roller can be sandwiched between said idler roller and the mandrel and then transferred to said mandrel, with the carrier layer being wound on said rewind roller, and wherein said knife holder holds said knife such that a cutting edge of said knife is positioned adjacent and spaced from said idler roller.

17. The apparatus of claim 13, wherein said means for moving includes pivot means for pivotally moving said mounting frame relative to said mandrel.

18. The apparatus of claim 17, wherein said pivot means includes:

a pivot shaft secured to a main frame member, and at least one link arm, each link arm pivotally connected at one end to said pivot shaft and fixedly connected at an opposite end thereof to said mounting frame, such that said mounting frame is effectively pivotally mounted about said pivot shaft.

19. The apparatus of claim 18, wherein said pivot means includes means for controlling pivoting movement of said mounting frame about said pivot shaft.

20. The apparatus of claim 19, wherein said means for controlling includes piston-cylinder means having a cylinder pivotally connected to said main frame member, and a piston with a free end pivotally connected to said mounting frame and an opposite end slidably connected within said cylinder.

21. The apparatus of claim 17, wherein said knife assembly is positioned on said mounting frame such that said knife assembly automatically cuts the adhesive layer extending between said supply roller and the mandrel, upon continued pivoting movement of said mounting frame after said adhesive layer has been transferred to said mandrel.

22. The apparatus of claim 13, wherein said adhesive layer includes:

a layer of weak adhesive on said carrier layer, a separation layer on said layer of weak adhesive, and a layer of strong adhesive on said separation layer, such that said layer of strong adhesive, said separation layer and said layer of weak adhesive detach from said carrier layer and said layer of strong adhesive is secured to the core on the mandrel.

* * * * *